United States Patent
Oga

(10) Patent No.: US 9,246,316 B2
(45) Date of Patent: Jan. 26, 2016

(54) WIRING HARNESS

(75) Inventor: Tatsuya Oga, Kosai (JP)

(73) Assignee: Yazaki Corporation, Tokyo (JP)

( * ) Notice: Subject to any disclaimer, the term of this patent is extended or adjusted under 35 U.S.C. 154(b) by 130 days.

(21) Appl. No.: 13/992,359

(22) PCT Filed: Dec. 7, 2011

(86) PCT No.: PCT/JP2011/078844
§ 371 (c)(1),
(2), (4) Date: Jun. 7, 2013

(87) PCT Pub. No.: WO2012/077826
PCT Pub. Date: Jun. 14, 2012

(65) Prior Publication Data
US 2013/0248246 A1    Sep. 26, 2013

(30) Foreign Application Priority Data

Dec. 10, 2010    (JP) .................................. 2010-275707

(51) Int. Cl.
*H02G 3/04*      (2006.01)
*B60R 16/02*     (2006.01)
*H02G 15/115*    (2006.01)

(52) U.S. Cl.
CPC .......... *H02G 3/0406* (2013.01); *B60R 16/0207* (2013.01); *B60R 16/0215* (2013.01); *H02G 3/0462* (2013.01); *H02G 15/115* (2013.01)

(58) Field of Classification Search
USPC .............................................. 174/84 R, 94 R
IPC ....................................................... H02G 3/04
See application file for complete search history.

(56) References Cited

U.S. PATENT DOCUMENTS

| 4,849,580 | A | * | 7/1989 | Reuter | ........................... 174/92 |
| 5,316,789 | A | * | 5/1994 | Ookuma et al. | ............... 427/117 |
| 7,572,979 | B2 | * | 8/2009 | Otsuki et al. | ................. 174/84 R |
| 8,324,502 | B2 | * | 12/2012 | Kameda et al. | ............. 174/77 R |
| 2004/0099427 | A1 | | 5/2004 | Kihira | |
| 2006/0272845 | A1 | | 12/2006 | Galey et al. | |
| 2010/0043225 | A1 | | 2/2010 | Oga et al. | |
| 2013/0306371 | A1 | * | 11/2013 | Toyama | ...................... 174/72 A |

FOREIGN PATENT DOCUMENTS

| EP | 1234727 A1 | 8/2002 |
| JP | 2004-224156 A | 8/2004 |
| WO | WO-2005/106305 A1 | 11/2005 |

OTHER PUBLICATIONS

International Search Report dated May 22, 2012 and Written Opinion of the International Searching Authority, issued for PCT/JP2011/078844.

* cited by examiner

*Primary Examiner* — Dhirubhai R Patel
(74) *Attorney, Agent, or Firm* — Locke Lord LLP; James E. Armstrong, IV; Brian S. Matross

(57) ABSTRACT

A wiring harness includes a first power transmission path; a second power transmission path; a connecting part; and a connector. The first power transmission path has stiffness ensuring autonomously retention of its shape, the shape coinciding with an arrangement path. The second power transmission paths have stiffness smaller than that of the first power transmission path and also have flexibility. The connecting part includes a connection structure configured to connect conductive ends of the first power transmission path and the second power transmission paths to each other with the conductive ends being electrically insulated from outside.

9 Claims, 6 Drawing Sheets

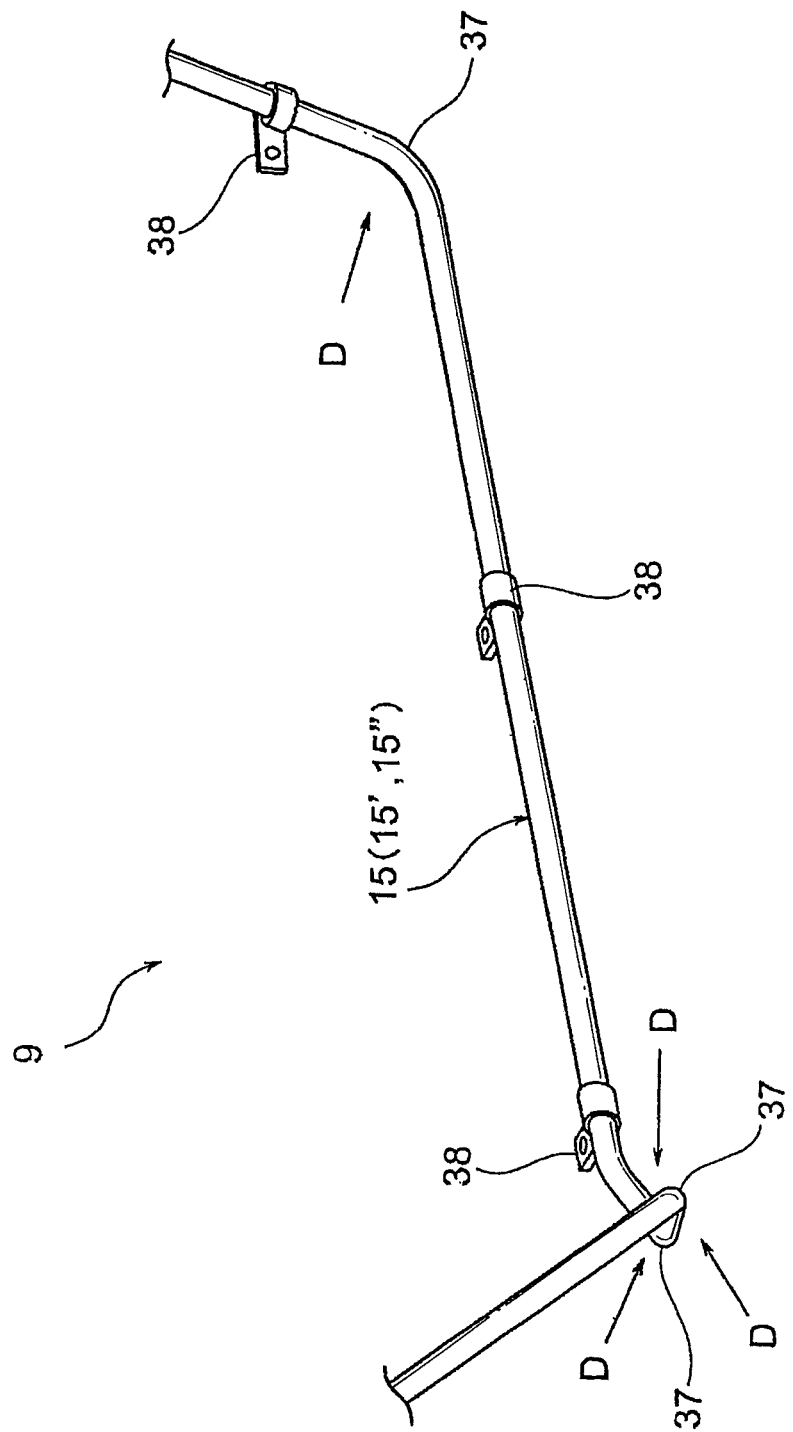

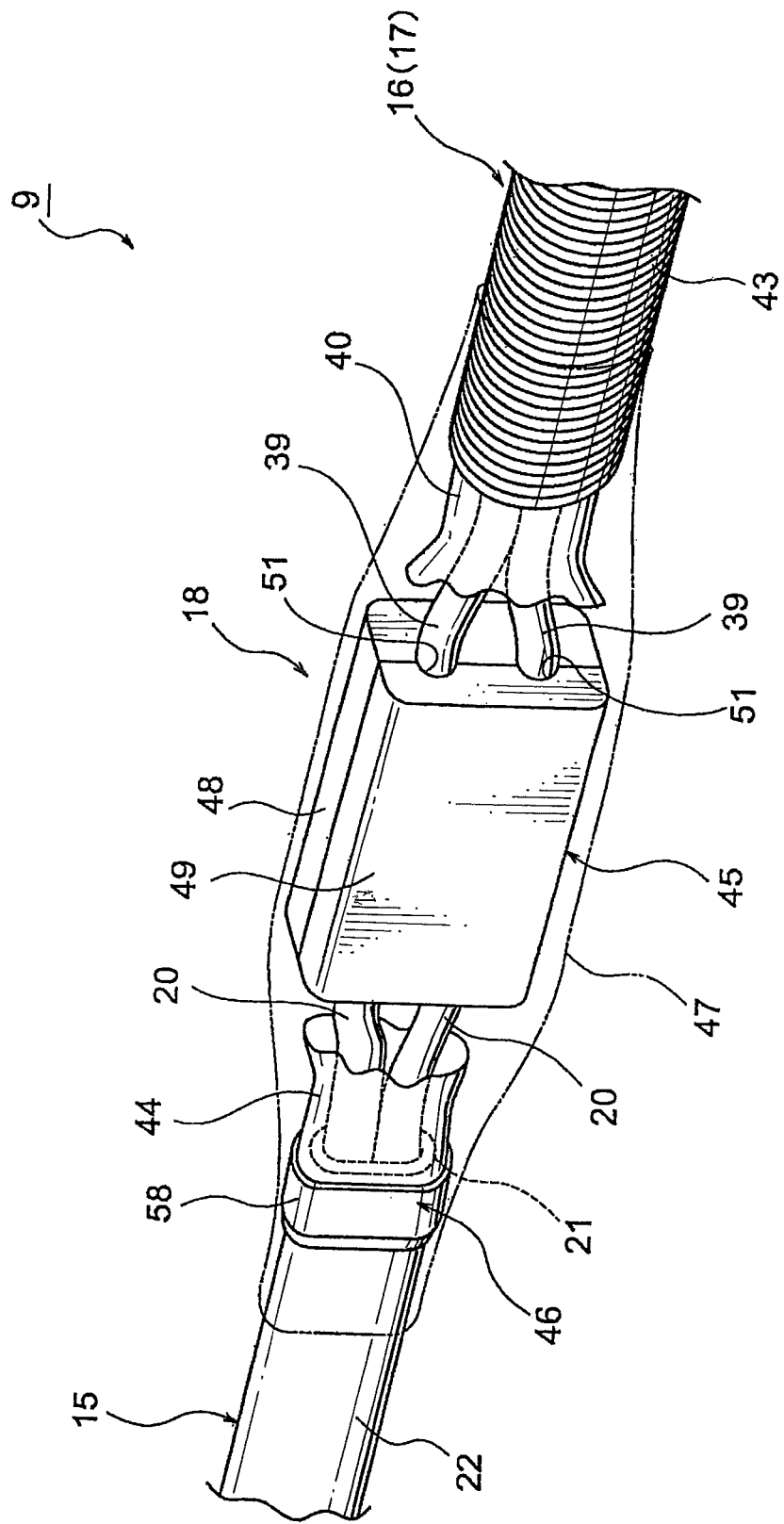

WIRING HARNESS

TECHNICAL FIELD

The present invention relates to a wiring harness that comprises a first power transmission path, a second power transmission path, and a connecting part.

BACKGROUND ART

The wiring harness disclosed in the patent literature PTL 1 comprises three high-voltage electrical wires and three metallic protective pipes each accommodating corresponding one of the three high-voltage electrical wires for protection thereof The high-voltage electrical wire is configured for connecting a motor provided in a front portion of a vehicle to an inverter provided in an intermediate or rear portion of the vehicle.

The wiring harness is arranged extended through a vehicle-body's underfloor provided outside of a frame of the vehicle body. Due to this configuration, the metallic protective pipes are adapted to protect the high-voltage electrical wires against hitting by pebbles and splashing of water. The metallic protective pipe has not only stiffness required for protection of the high-voltage electrical wires against hitting by pebbles and splashing of water and prevention of loosening of the high-voltage electrical wires, but also electromagnetic shielding functionality inasmuch as it is a metal component.

The wiring harness is obtained by inserting the three high-voltage electrical wires each into the corresponding one of the three metallic protective pipes that are extended straight, and bending the metallic protective pipes such that its shape coincides with an arrangement path of the wiring harness in the vehicle-body's underfloor. The wiring harness is manufactured in this manner in a factory of a wire harness manufacturer, and then transported to an assembly factory of an automobile manufacturer, where the wiring harness is attached to a prescribed location in a vehicle, so that arrangement thereof is completed.

CITATION LIST

Patent Literature

PTL 1: Japanese Patent Application Laid-Open Publication No. 2004-224156

SUMMARY OF THE INVENTION

Technical Problem

In the state of the art as described above, the metallic protective pipe, which is configured as an exterior armor element, also serves as an arrangement-path retention element that ensures the arrangement path of the wiring harness. In addition to or in place of the metallic protective pipe, a protector made of resin may be also suitable as such an arrangement-path retention element.

Since the protector is a molded article obtained by using a mold or die, inexpensive input materials are readily available. Downside to molding of the protector, however, is that the protector will be a more costly article when the costs related to the mold as such increases. Also, if the protectors should be manufactured in small quantities, depreciation of the mold will be a burden in terms of the price of the protectors. When the more expensive the protector, the more costly the wiring harness must be.

There are other drawbacks. In view of the long lead time for constructing the mold for the protector, it is necessary to create drawings for the mold in a short period of time, which could cause frequent and complicated design changes, increasing man-hours for design process. Also, making design changes requires time and cost.

In view of the above-identified drawbacks, an object of the present invention is to provide an inexpensive wiring harness.

Solution to Problem

In order to provide solution to the above-described problems, a first aspect of the present invention provides a wiring harness that comprises: (a) a first power transmission path; (b) a second power transmission path; and (c) a connecting part connecting the first power transmission path to the second power transmission path.

The first power transmission path has such stiffness that the first power transmission path retains a shape that coincides with an arrangement path of the first power transmission path;

The second power transmission path has stiffness smaller than that of the first power transmission path and having flexibility.

The connecting part includes a connection structure configured to connect a conductive end of the first power transmission path and a conductive end of the second power transmission path to each other with the conductive ends insulated from outside.

The present invention with such features provides the wiring harness that can ensure the arrangement path retention autonomously achieved by the first power transmission path without using a protector. The wiring harness is constructed by disposing two second power transmission paths at corresponding each of the both ends of the first power transmission path and then connecting the first and second power transmission paths to each other.

A second aspect of the present invention provides the wiring harness in the context of the first aspect further characterised by the fact that at least the first power transmission path or both of the first and second power transmission paths have a conductor, an insulation, a shielding member, and a sheath which also serves as an exterior armor element.

The present invention with such features provides the wiring harness that includes the sheath that also features exterior armor functionality.

A third aspect of the present invention provides the wiring harness in the context of the second aspect further characterized by the fact that the shielding member of either one of the first power transmission path and the second power transmission. path has a length extending past a connecting region where the conductive ends are connected to each other and reaching the shielding member of an other of the first power transmission path and the second power transmission path.

The present invention with such features provides the wiring harness in which the connecting region of the conductor ends of the first power transmission path and the second power transmission path is covered by the longer shielding member of the first power transmission path or the second power transmission path and the connection of the shielding members is done at a location other than the above-mentioned connecting region, so that the wiring harness can be smaller in its outer diameter.

A fourth aspect of the present invention provides the wiring harness in the context of any of the first to third aspects further characterized by the fact that the first power transmission path is configured as a member adapted to be arranged along a floor of a vehicle.

The present invention with such features provides the wiring harness that can provide arrangement path retention allowing the first power transmission path to be arranged along the floor of the vehicle.

A fifth aspect of the present invention provides the wiring harness in the context of any one of the first to fourth aspects further characterised by the fact that the first power transmission path includes a bent portion bent by a bending machine.

The present invention with such features provides the wiring harness that has the desired shape with the bent portion formed by the bending machine.

Advantageous Effects of Invention

According to the first aspect of the present invention, the first power transmission path as such can also serve as an arrangement-path retention element. Accordingly, a protector and a resin molding die do not need to be provided.

Hence, the invention has the advantageous effect of providing an inexpensive the wiring harness.

According to the second aspect of the present invention, the sheath constituting the first power transmission path can also serve as an exterior armor element. Accordingly, the resent invention does not need to provide an exterior armor element at least at the location of the first power transmission path.

Hence, the invention has the advantageous effect of providing an inexpensive the wiring harness.

According to the third aspect of the present invention, it is made possible to reduce the man hours consumed in connecting the shielding members to each other, the shielding members constituting the first power transmission path and the second power transmission path.

Hence, the invention has the advantageous effect of providing an inexpensive the wiring harness.

The fourth aspect of the present invention has the advantageous effect of providing a wiring harness that can be arranged on the floor of the vehicle.

In accordance with the fifth aspect of the present invention, when the desired location of the first power transmission path is bent by the bending machine and thereby the bent portion is formed in the first power transmission path, the wiring harness cab be arranged with the shape of the bent portion retained. Accordingly, path formation can be readily made by using the bending machine, and thereby it is made possible to provide an inexpensive the wiring harness.

In addition, in accordance with the present invention, use of the bending machine allows path formation to be done by software program, which lead to reduction in the lead time required for related processes. Also, the present invention facilitates design changes and reduces the man hours consumed in design process. Further, with regard to the costs related to the design changes, modification of software programs is by far inexpensive when compared with revision of a molding die, which contributes to further cost reduction.

BRIEF DESCRIPTION OF THE DRAWINGS

In the drawings:

FIG. 3 is a perspective view of the first power transmission path that is bent by a bending machine to form a bent portion;

FIG. 5 is a perspective view of a connecting part configured to connect the first power transmission path and the second power transmission path to each other;

DESCRIPTION OF EXEMPLARY EMBODIMENTS

A wiring harness of the invention comprises a stiff portion, a flexible portion, and a connecting part connecting the stiff portion to the flexible portion. The shape of the stiff portion is retained autonomously by the stiff portion itself (or in a self-sustained manner). The stiffness of the flexible portion is smaller than that of the stiff portion.

The wiring harness is arranged along a floor of a vehicle. The stiff portion that can retain its shape autonomously does not include an exterior armor element. This stiff portion featuring autonomous shape retention is bent by a bending machine so as to form a bent portion.

(Illustrative Embodiments)

Figure 1:
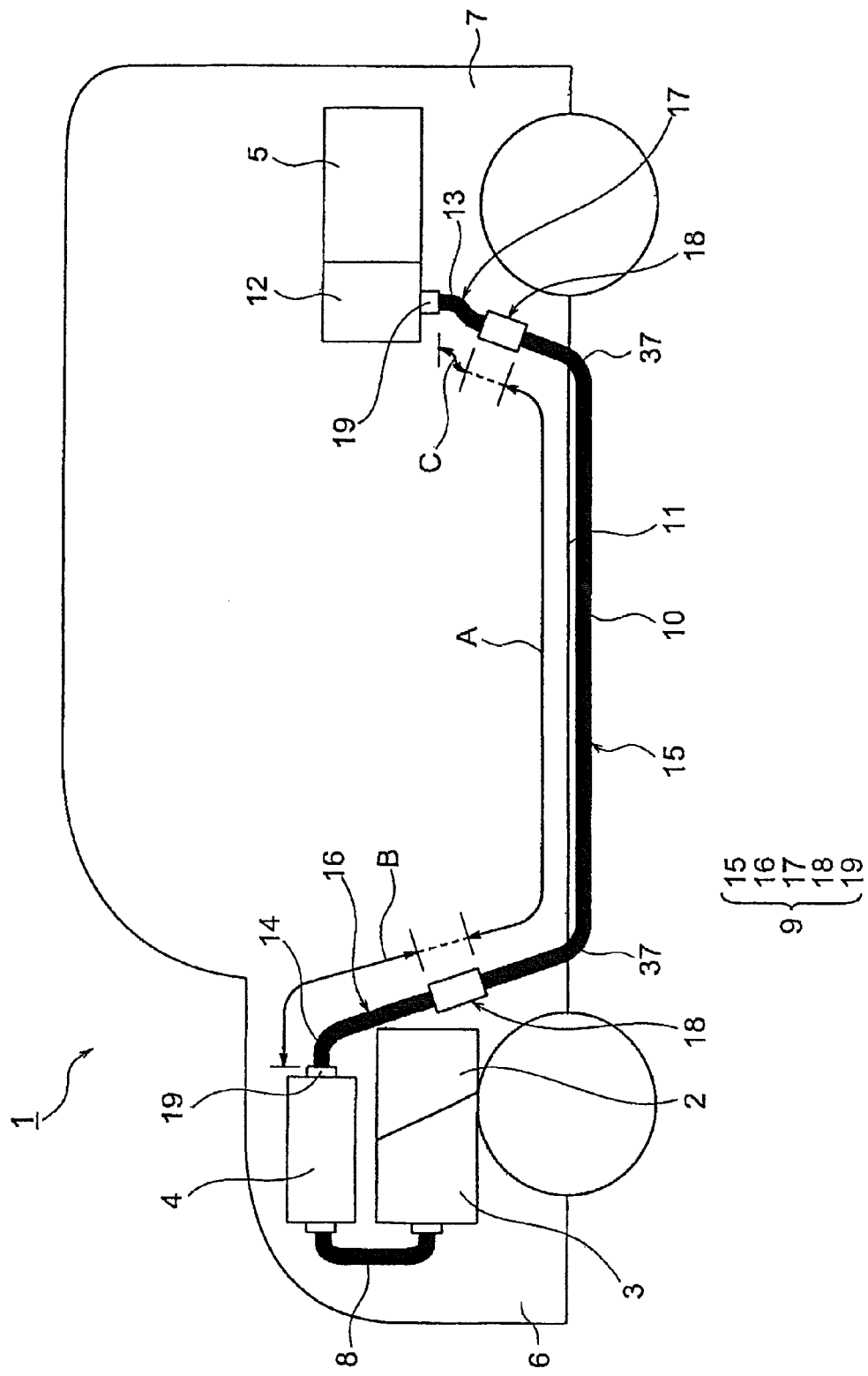
FIG. 1 is a schematic illustration of a hybrid automobile incorporating a wiring harness according to the present invention.
Figure 4A:
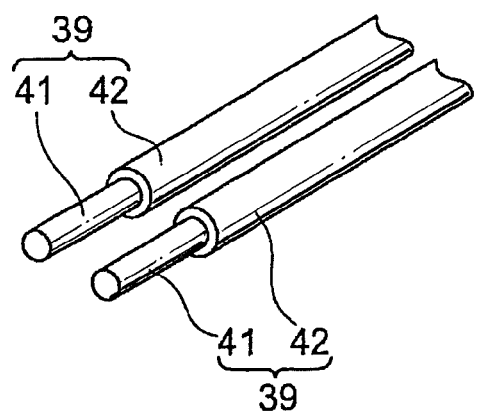
FIG. 4A is a perspective view of a high-voltage electrical wire constituting a second power transmission path.
Figure 4B:
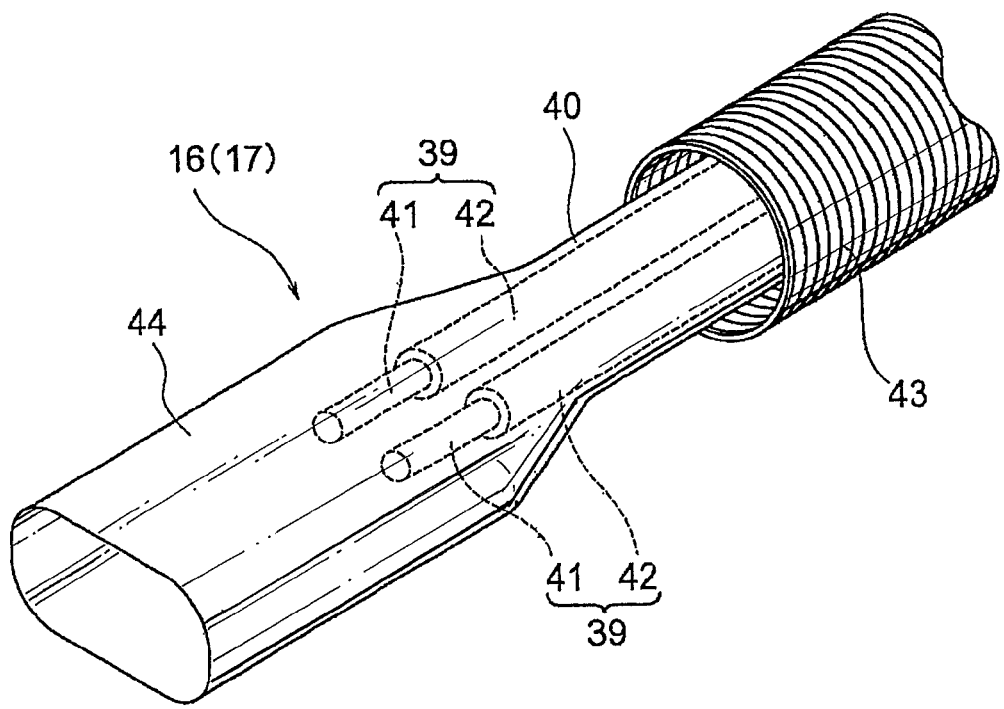
FIG. 4B depicts a configuration of the second power transmission path.
Figure 6A:
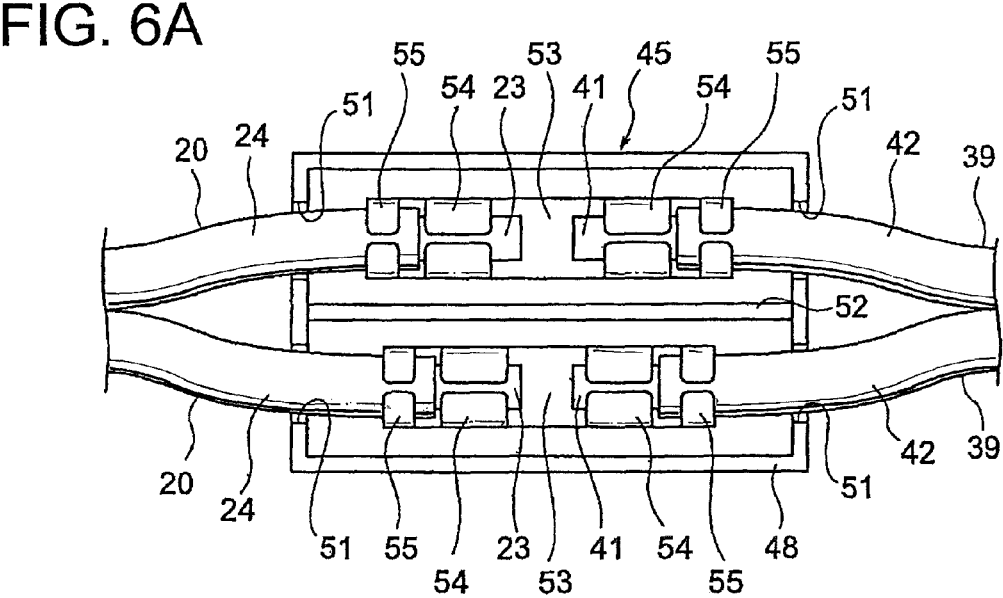
FIG. 6A illustrates a major portion of the connecting part including a connection structure within an insulating box.

The embodiments of the invention are described below with reference to the drawings, in which: FIG. 1 is a schematic illustration of a hybrid automobile in which the wiring harness of the present invention is arranged; FIG. 2 illustrates a configuration of a first power transmission path; FIG. 3 is a perspective view of the first power transmission path shown in a bent state; FIG. 4 illustrates a configuration of a second power transmission path; FIG. 5 is a perspective view of a connecting part; and FIG. 6 illustrates major portion of the connecting part.

It should be noted that the embodiments are described in the context of a hybrid automobile in which the wiring harness of the present invention is to be arranged (it is contemplated that the automobile may be an electric automobile).

Referring first to FIG. 1, there is depicted a hybrid automobile indicated by the reference sign 1. The hybrid automobile 1 is driven in a hybrid manner by two power sources, i.e., an engine 2 and a motor unit 3. Electrical power is fed to the motor unit 3 by a battery 5 (battery pack) and via an inverter unit 4.

In this embodiment, the engine 2, the motor unit 3, and the inverter unit 4 are arranged in an engine room 6 provided at a location near the automobile's front wheels. The battery 5, on the other hand, is arranged in a rear portion 7 of the automobile where rear wheels thereof are provided (alternatively, the battery 5 may be arranged in an interior of the automobile next to the engine room 6).

The motor unit 3 and the inverter unit 4 are connected to each other via a known high-voltage wiring harness 8. The battery 5 is connected to the inverter unit 4 via the wiring harness 9 of the present invention.

The wiring harness 9 is configured for high-voltage use. Also, an intermediate portion 10 of the wiring harness 9 (i.e., a first power transmission path 15, which will be described later in detail) is arranged near an underside 11 of a floor of a vehicle body, the underside 11 facing a road surface (alternatively, the intermediate portion 10 may be arranged near an upper side of the floor facing vehicle's interior). The underside 11 of the floor (which also is indicated by the same reference sign) of the vehicle body is a panel-like part of a known vehicle body. There may be provided through holes (without reference signs) each extending at predetermined locations through the floor 11. The locations where the throughholes are provided may include not-shown waterproof features.

The wiring harness 9 is connected to the battery 5 via a junction block 12 provided in the battery 5. Specifically, a rear end 13 of the wiring harness 9 is connected to the junction block 12 by means of a connector or a bolt. The rear end 13 of the wiring harness 9 is arranged above the upper side of the floor so as to reside in or near the automobile's interior. A front end 14 of the wiring harness 9 is also arranged above the upper side of the floor. The front end 14 of the wiring harness 9 is connected to the inverter unit 4 by means of a connector or a bolt.

As a supplementary explanation in the context of the illustrative embodiment, it is contemplated that the motor unit 3 includes a motor and a generator, and that the inverter unit 4 includes an inverter and a converter. The motor unit 3 is constructed as a motor assembly that includes a shielding case. Also, the inverter unit 4 is constructed as an inverter assembly that includes a shielding case. The battery 5 may comprise a modular (or modularized) nickel metal hydride (Ni-MH) battery or a lithium-ion battery. The battery 5 may includes a storage device for storing electric charge, such as a capacitor. The battery 5 is not limited to specific configurations as long as it can be used in the hybrid automobile 1 (or the electric automobile).

The configuration and arrangement of the wiring harness 9 is described below in detail.

The wiring harness 9 includes a first power transmission path 15; second power transmission paths 16, 17; a connecting part 18; and a connector 19 (or a connecting terminal).

The first power transmission path 15 has such stiffness that it can autonomously retain its shape that coincides with an arrangement path of the wiring harness 9. In other words, the first power transmission path 15 has such stiffness that, once the path 15 is taken out of a straight extended state and is bent, the path 15 will not be restored to its original straight extended state but kept in the bent state.

The second power transmission paths 16, 17 have stiffness smaller than that of the first power transmission path 15, and also have flexibility.

The connecting part 18 includes a connection structure configured to connect a conductive end of the first power transmission path 15 to a conductive end of the second power transmission path 16, 17 with the both conductive ends insulated from outside.

The first power transmission path 15 is arranged in the range indicated by the reference sign A. The first power transmission path 15 is adapted to ensure the above-described retention of shape within the range A. Also, the second power transmission paths 16, 17 are arranged in ranges indicated by the reference signs B and C. The second power transmission paths 16, 17 are adapted to ensure the above-described smaller stiffness and the flexibility within the ranges B and C.

Figure 2A:
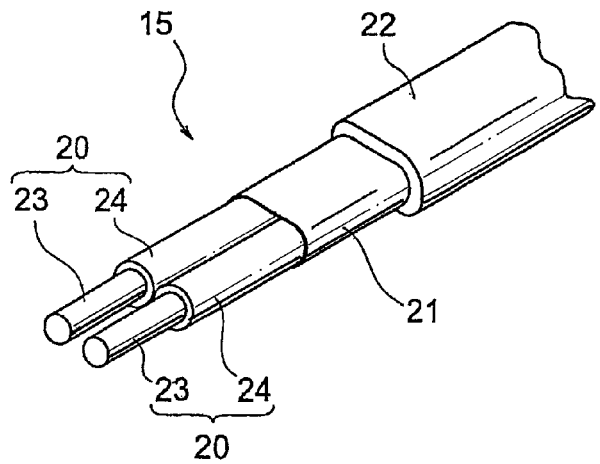
FIG. 2A depicts a configuration of a first power transmission path according to a first embodiment.

Referring to FIG. 2A, the first power transmission path 15 comprises (a) a pair of insulated wire cores 20, 20 for high-voltage use, (b) a shielding member 21 shielding at one time the insulated wire cores 20, 20 extending side by side with each other, and (c) a sheath 22 extrusion-molded on an outer surface of the shielding member 21. The insulated wire core 20 includes a conductor 23 and an insulation 24 provided on the outer surface of the conductor 23. The first power transmission path 15 is an electrical wire that has no exterior armor element. Also, the first power transmission path 15 is an electrical wire that incorporates features including, but not limited to, electrical conductivity, electromagnetic shield, retention of shape, and protection of electrical wires.

The conductor 23 may comprise a round-bar wire (round single-core conductor structure) made of aluminum or aluminum alloy. It is also contemplated that the conductor 23 may comprise a square bar wire (rectangular single-core conductor structure) or busbar-shaped conductor structure. Also, a twisted-wire conductor structure may be used as long as the stiffness is sufficient to achieve the above-described retention of shape. In addition, the material is not limited to the above-mentioned one. Specifically, copper and copper alloy may be used. In this embodiment, the one made of aluminum is advantageously used, for it is inexpensive and lightweight.

The insulation 24 is a cover member covering the conductor 23 and is obtained by extrusion molding of known resin material.

The shielding member 21 is a member for electromagnetic shield covering a pair of insulated wire cores 20, 20 (countermeasure element against electromagnetic waves radiation), includes conductive metallic foil, and takes a cylindrical shape. Alternatively, it may only comprise metallic foil in a cylindrical shape. The shielding member 21 has the substantially same length as the overall length of the pair of insulated wire cores 20, 20.

It should be noted that the shielding member 21 is not limited to the metallic foil construction of this illustrative embodiment. Specifically, as long as protection against electromagnetic waves radiation can be ensured, a braided shield may be used that comprises numerous extra-fine strands. The braided shield is electrically conductive and takes a cylindrical shape (metallic foil is advantageous in that it allows far more reduction in weight than the braided shield). Electrical connection of the shielding member 21 will be described later in detail.

The sheath 22 is shaped by extrusion molding using a resin material selected in view of its favorable properties including thermal resistance, wear resistance, weathering resistance, impact resistance, and extrusion moldability. The sheath 22 is configured such that its surface corresponds to an outer surface of the first power transmission path 15. The sheath 22 is adapted to protect the first power transmission path 15 against hitting by pebbles and splashing of water. The sheath 22 is configured such that it allows elimination of an exterior armor element in the first power transmission path 15.

The following describes another example of the first power transmission path 15 (suffix symbols representing derivative nature of an element are appended as required to the original reference signs so as to emphasize the difference(s) from the example depicted in FIG. 2A).

Figure 2B:
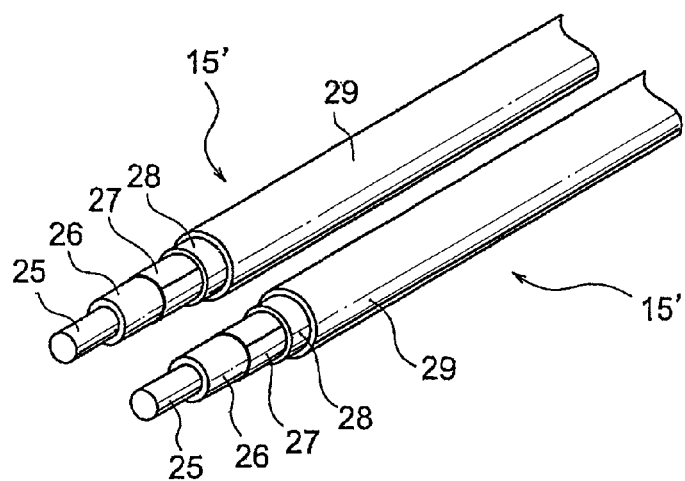
FIG. 2B depicts a configuration of the first power transmission path according to a second embodiment.

Referring now to FIG. 2B, there is shown a first derivative faun of a pair of first power transmission paths 15'. The first power transmission paths 15', 15' each includes a conductor 25, an insulation 26 extruded on the outer surface of the conductor 25, a shield 27 wound around the insulation 26, a first sheath 28, and a second sheath 29, the sheaths being extruded on the outer surface of the shield 27. The first power transmission path 15' has a configuration similar to that of a known shielded electrical wire.

The conductor 25 is of the same construction as that of the above-described conductor 23. Also, the insulation 26 is of the same construction as that of the above-described insulation 24. The shield 27 is an electromagnetic shielding member residing between the insulation 26 and the first sheath 28 (as a countermeasure against electromagnetic waves radiation). The shield 27 may be made of conductive metallic foil and has a tubular shape (braided construction may be employed).

The first power transmission path 15' has, but not limited to, a sheath with a two-layer structure. Specifically, the sheath is constituted by the first sheath 28 and the second sheath 29. The outer second sheath 29 is configured to have the same functionality as that of the above-described sheath 22.

It should be noted that the first sheath 28 and the second sheath 29 constitute the two-layer structure for increased protection. However, the sheath is not limited to this specific structure and may have a single-layer structure as in the case of the above-described sheath 22.

Figure 2C:
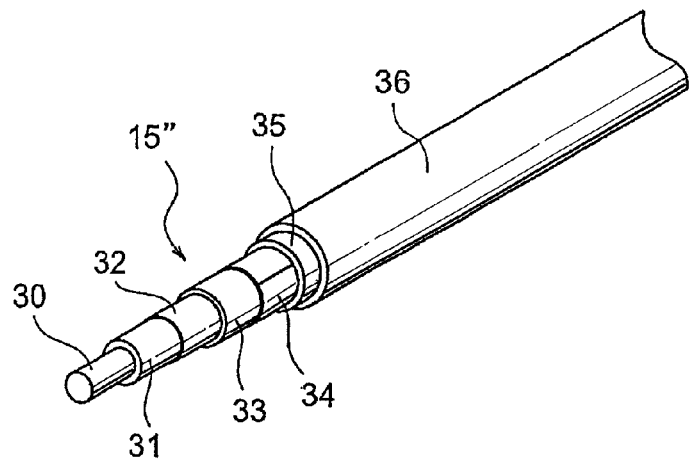
FIG. 2C depicts a configuration of the first power transmission path according to a third embodiment.

Referring to FIG. 2C, there is depicted a second derivative form of the first power transmission path 15", which comprises a positive-electrode conductor 30, an insulation 31 extruded on the outer surface of the positive-electrode conductor 30, a negative-electrode conductor 32 provided on the outer surface of the insulation 31, an insulation 33 extruded on the outer surface of the negative-electrode conductor 32, a shield 34 wound around. the insulation 33, a first sheath 35, and a second sheath 36, the sheaths being extruded on the outer surface of the shield 34.

The positive-electrode conductor 30 has the same construction as that of the above-described conductor 23, 25. Also, the insulations 31, 33 have the same construction as that of the above-described insulations 24, 26. Further, the first sheath 35 and the second sheath 36 are of the same construction as that of the above-described first sheath 28 and the second sheath 29. Also, the shield 34 has the same construction as that of the above-described shield 27.

The negative-electrode conductor 32 takes a tubular shape that is concentric with the positive-electrode conductor 30 and surrounds the positive-electrode conductor 30 with the insulation 31 provided between the conductors 30, 32. The size of the negative-electrode conductor 32 is equal to or larger than that of the positive-electrode conductor 30. Specifically, for example, if the size of the positive-electrode conductor 30 is 15 sq, then the size of the negative-electrode conductor 32 will be equal to or larger than 15 sq. One reason for this is that ground connection is facilitated by increasing the size of the negative-electrode conductor 32, with improved electrical stability.

The conductive portion of the first power transmission path 15" constitutes a coaxial three-layer structure defined by the positive-electrode conductor 30, the negative-electrode conductor 32, and the shield 34.

As advantageous effects of the first power transmission path 15", the first power transmission path 15" can integrate the pair of the first power transmission paths 15', 15' of FIG. 2B into a single path, which leads to reduction in the space required for arrangement of the wiring harness and reduction in weight of the wiring harness. Also, two paths integrated into a single path will lead to reduction in man-hours in the steps related to assembling of the wiring harness. Further, it is made possible to reduce the usage of the conductor and the insulation, so that reduction in material costs is achieved.

In addition, since the positive-electrode conductor 30 is surrounded by the negative-electrode conductor 32 with currents flowing in the opposite direction in the negative-electrode conductor 32 and in the positive-electrode conductor 30, larger shielding effects can be realized and leakage of noise to outside can be prevented. Accordingly, the risk of malfunctioning can be reduced.

When the above-described first power transmission path 15 (15', 15") that have been manufactured is bent at a predetermined location (for example, the location indicated by the arrow D in FIG. 3) using a not-shown bending machine, the bent portion 37 is formed as shown in FIG. 3. When the bent portion 37 is formed, the first power transmission path 15 will be retained in the shape that coincides with the arrangement path of the wiring harness 9. Also, when the bent portion 37 is formed, the first power transmission path 15 (15', 15") is not restored to the original state and retained in the bent state in particular by virtue of the stiffness of the conductor 23 (conductor 25, or positive-electrode conductor 30).

The reference sign 38 (in FIG. 3) indicates a securing clamp. As the first power transmission path 15 (15', 15") provides the shape retention feature, such small elements as the illustrated clamps 38 will be sufficient as the securing feature for the wiring harness.

With regard to the above-mentioned bending machine (not shown), installation of this machine is not limited to a specific location. Specifically, the bending machine may be installed in a wiring harness manufacturing factory or in any other site related to arrangement of the wiring harness. The location of installation may be defined in view of workability.

Referring now to FIG. 4, the second power transmission paths 16, 17 comprise a pair of insulated wire cores 39, 39 adapted for high-voltage use and a shielding member 40 covering them. The insulated wire core 39 includes a conductor 41 and an insulation 42 extruded on the outer surface of the conductor 41. The second power transmission paths 16, 17 are inserted into a flexible tubular body 43 such that they extend therein. In other words, the second power transmission paths 16, 17 are protected by the tubular body 43 (use of the tubular body 43 may be optional). The second power transmission paths 16, 17 as have been described above have stiffness smaller than that of the first power transmission path 15 and also have flexibility.

The conductor 41 may comprise a twisted-wire-type conductor body constructed by twisting strands made of aluminum or aluminum alloy, the conductor 41 being selected in view of ensuring the above-mentioned flexibility. It is also contemplated that, as long as desired flexibility is obtained, a round-bar wire or a square-bar wire may be used. The material is not limited to the above-mentioned one. Specifically, copper and copper alloy may be used. In this embodiment, the one made of aluminum is advantageously used inasmuch as it is inexpensive and lightweight.

The insulation 42 is a member covering the conductor 41, which is obtained by extrusion molding of known resin material.

The shielding member 40 is a member adapted for electromagnetic shield covering the pair of insulated wire cores 39, 39 (a countermeasure element against electromagnetic waves radiation), and has the same construction as that of the shielding member 21 of the first power transmission path 15 (see FIG. 2A). In other words, since the shielding member 21 of the first power transmission path 15 may comprise metallic foil, it has the same construction.

The shielding member 40 extends to an extent larger than the overall length of the pair of insulated wire cores 39, 39. In other words, the shielding member 40 has an elongated cylindrical shape covering the major portion of the connecting part 18 (see FIG. 5). The reference sign 44 drawn from the shielding member 40 indicates an enlarged cylindrical portion covering the major portion of the connecting part 18. The enlarged cylindrical portion 44 is provided at an end of the shielding member 40 where the shielding member 40 is connected to the first power transmission path 15 (see FIG. 5).

A known connector 19 (see FIG. 1) or a connecting terminal is attached in a known manner to an end of the second power transmission paths 16, 17 where the connection to the first power transmission path 15 is not takes place. The connector 19 may also include a known shield terminating structure.

The tubular body 43 in this embodiment comprises a known corrugated tube (a resin tube having flexibility is preferable). The tubular body 43 has insulation property.

As the second power transmission paths 16, 17 have flexibility, they may be secured using the above-described clamp 38 (see FIG. 3) after being placed in the desired arrangement shape.

Referring to FIG. 5, the connecting part 18 comprises a conductor connecting structure 45, a shield connecting structure 46, and a cover portion 47. The connecting part 18 is not an ordinary connection element, but a portion configured to connect the first power transmission path 15 and the second power transmission paths 16, 17 to each other taking the configuration and structure into consideration.

Referring to FIGS. 5 and 6, the conductor connecting structure 45 is a portion configured to connect the conductive ends of the first power transmission path 15 and the second power transmission paths 16, 17 to each other with the conductive ends insulated from outside. The structure 45 comprises an insulating box 48, an insulating cover 49 brought into fitting engagement with the insulating box 48 such that the opening of the insulating box 48 is covered thereby, and a connecting terminal 50 accommodated in and secured to the insulating box 48.

The insulating box 48 and the insulating cover 49 are resin molded articles with insulation property. When not-shown engagement portions of the insulating box 48 and the insulating cover 49 are brought into fitting engagement with each other, they constitute a single chassis.

The reference sign 51 indicates inlet-outlet holes for insertion of the insulated wire core 20 and insulated wire core 39. Also, the reference sign 52 indicates a partition wall. In this embodiment, the insulating box 48 and the insulating cover 49 have a shape with no protruding edges provided on the outer surface thereof.

With regard to the insulating box 48 and the insulating cover 49, it suffices that they ensure insulation of the conductor connecting structure 45. In place of them, a tape, tube, or sheet having insulating property may also be used. It is appreciated that use of the tape, tube, or sheet allows reduction in size of this insulation portion.

The connecting terminal 50 is a portion adapted for connection of a conductive end, and is made by pressing working of a conductive metal plate. In this embodiment, the connecting terminal 50 includes a generally strip-shaped base plate 53, conductor-caulking portions 54 continuing to lateral sides of the base plate 53, and insulation-caulking portions 55 likewise continuing to the lateral sides of the base plate 53, and taking the depicted shape.

The conductor-caulking portion 54 is a portion adapted for caulking and electrically connecting the conductor 23 of the insulated wire core 20 and the conductor 41 of the insulated wire core 39 to the base plate 53. Also, the insulation-caulking portion 55 is also adapted for caulking, and mechanically securing the insulation 24 of the insulated wire core 20 and the insulated wire core 39 of the insulation 42 to the base plate 53.

The shield connecting structure 46 electrically connect the shielding member 21 and the shielding member 40 to each other. Specifically, the shield connecting structure 46 is constructed by electrically connecting the enlarged cylindrical portion 44 of the shielding member 40 of the second power transmission path 16, 17 to the end of the shielding member 21 of the first power transmission path 15. The enlarged cylindrical portion 44 is connected to an end of the shielding member 21 such that it covers the conductor connecting structure 45. This state will be described in more detail below.

Figure 6B:
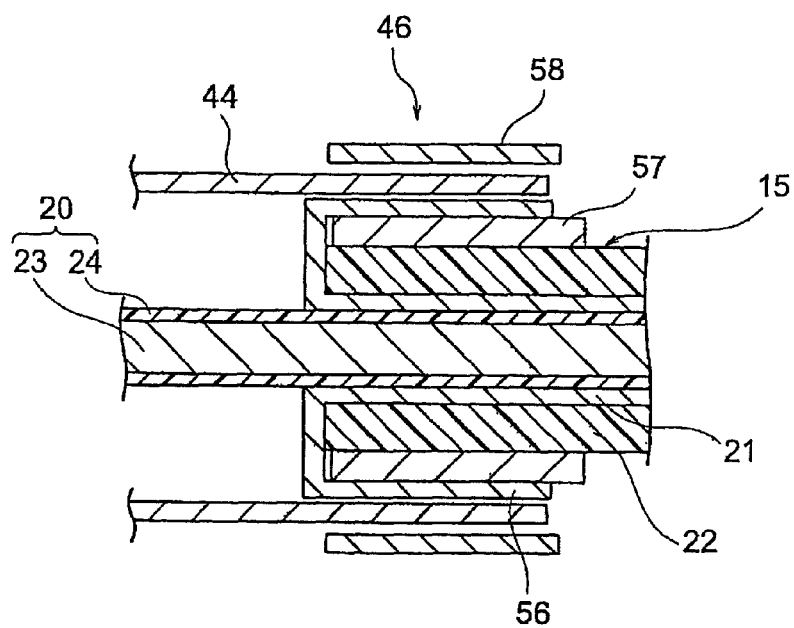
FIG. 6B illustrates a major portion of the connecting part including the connection structure connecting shielding members to each other.

Referring to FIG. 6B, the shield connecting structure 46 includes the following elements of (a) a folded-back portion indicated by the reference sign 56, (b) a metallic inner ring member indicated by the reference sign 57, and (c) a metallic outer ring member indicated by the reference sign 58.

The folded-back portion 56 is constructed by folding back the shielding member 21 of the first power transmission path 15 so that it resides above the outer surface of the sheath 22.

The inner ring member 57 takes a cylindrical shape and is configured to be inserted into a space between the folded-back portion 56 and the sheath 22. The inner ring member 57 is configured as a member adapted to receive the caulking effect.

The outer ring member 58 is configured to electrically connect the folded-back portion 56 to an end of the enlarged cylindrical portion 44 disposed in an overlapping manner on the folded-back portion 56, the electrical connection therebetween being achieved by caulking.

As shown in FIG. 5, since the shield connecting structure 46 is provided spaced apart from the location where the conductive ends are brought into connection (i.e., spaced from the conductor connecting structure 45), by virtue of this spaced-apart configuration, the conductor connecting structure 45 does not become large in size, and connection operation will be facilitated.

When the shielding member 21 and the shielding member 40 are electrically connected to each other by the shield connecting structure 46, the entire wiring harness 9 will be shielded thereby.

Still referring to FIG. 5, the cover portion 47 is provided outside of the shielding member 21 and the shielding member 40 in the state of connection. Also, the cover portion 47 is adapted to provide insulation from outside and/or protection against outside elements. The cover portion 47 is attached to both the sheath 22 of the first power transmission path 15 and the tubular body 43 outside of the second power transmission paths 16, 17. The cover portion 47 may comprise, for example, a known gumboot-like element or a wound-tape-like structure.

As has been described in detail with reference to FIGS. 1 to 6, the wiring harness 9 does not need to have a protector functioning as an arrangement-path retention element, which eliminates use of a resin molding die and makes it possible to provide the inexpensive wiring harness 9. Also, since the wiring harness 9 makes the sheath 22 of the first power transmission path 15 serve as an exterior armor element, there is no need to use the exterior armor element at least at the location where the first power transmission path 15 resides, which makes it possible to provide the inexpensive wiring harness 9.

In addition, since the bending machine is used to form the bent portion 37 in the wiring harness 9, the arrangement path formation can be done by software program, which contributes to reduction in lead time related to the relevant processes. Also, it is made possible to facilitate design changes and reduce man-hours required for design process. Further, with regard to the costs related to the design changes, modification of software programs is by far inexpensive when compared with revision of a molding die, which contributes to further cost reduction.

It is appreciated that various modifications can be made to the present invention without departing from the spirit and scope of the invention.

Reference Signs
1 Hybrid automobile (vehicle)
2 Engine
3 Motor unit
4 Inverter unit
5 Battery
6 Engine room
7 Automobile's rear portion
7 Automobile's rear portion
8 High-voltage wiring harness
9 Wiring harness
10 Intermediate portion
11 Underside of vehicle's floor (floor)
12 Junction block
13 Rear end
14 Front end
15, 15', 15" First power transmission path
16, 17 Second power transmission path
18 Connecting part
19 Connector
20 Insulated wire core
21 Shielding member
22 Sheath
23 Conductor
24 Insulation
25 Conductor
26 Insulation
27 Shield
28 First sheath (sheath)
29 Second sheath (sheath)
30 Positive-electrode conductor (conductor)
31 Insulation
32 Negative-electrode conductor (conductor)
33 Insulation
34 Shield
35 First sheath (sheath)
36 Second sheath (sheath)
37 Bent portion
38 Clamp
39 Insulated wire core
40 Shielding member
41 Conductor
42 Insulation
43 Tubular body
44 Enlarged cylindrical portion
45 Conductor connecting structure (connection structure)
46 Shield connecting structure
47 Cover portion
48 Insulating box
49 Insulating cover
50 Connecting terminal
51 Inlet-outlet hole
52 Partition wall
53 Base plate
54 Conductor-caulking portion
55 Insulation-caulking portion
56 Folded-back portion
57 Inner ring member
58 Outer ring member

The invention claimed is:

1. A wiring harness, comprising: (a) a stiff portion defining a first power transmission path and having such stiffness to retain a shape corresponding to the first power transmission path; (b) a flexible portion defining a second power transmission path and having a stiffness smaller than the stiffness of the first power transmission path, and having flexibility; and (c) a connecting part connecting the stiff portion to the flexible portion, the connecting part including a connection structure configured to connect a conductive end of the stiff portion and a conductive end of the flexible portion to each other with the conductive ends insulated from outside, wherein one of the stiff and flexible portions has a conductor, an insulation, a first shielding member, and a sheath, the sheath also serving as an exterior armor element, and wherein the other of the stiff and flexible portions has a second shielding member, and one of the first and second shielding members has a length extending past a connecting region where the conductive ends of the stiff and flexible portions are connected to each other, and extends to the other of the first and second shielding members.

2. The wiring harness as set forth in claim 1, wherein the stiff portion is configured as a member adapted to be arranged along a floor of a vehicle.

3. The wiring harness as set forth in claim 2, wherein the stiff portion includes a bent portion bent by a bending machine.

4. The wiring harness as set forth in claim 1, wherein the stiff portion includes a bent portion bent by a bending machine.

5. The wiring harness according to claim 1, further comprising a shield connecting structure, wherein each of the stiff and flexible portions includes the shielding member and the sheath with the sheath operatively disposed radially outward of and substantially concentric with a respective conductive end, and the shield connecting structure is configured to electrically connect the shielding member of the stiff portion with the shielding member of the flexible portion to shield the wiring harness.

6. The wiring harness according to claim 5, wherein the stiff portion includes a bend portion and a straight portion.

7. The wiring harness according to claim 1, wherein the stiff portion has sufficient stiffness to autonomously retain the shape corresponding to the first power transmission path.

8. The wiring harness according to claim 1, wherein the connection structure of the connecting part includes an insulating chassis radially outward of and insulating the conductive ends of the stiff and flexible portions.

9. The wiring harness according to claim 8, wherein the connection structure includes a conductive metal plate operatively disposed inside the chassis and electrically connecting the conductive ends of the stiff and flexible portions.

* * * * *